APPARATUS FOR PRINTING MAGNETIC SOUND RECORD PROVIDED WITH A DEVICE FOR THE INSPECTION OF THE INTENSITY OF PRINTED MAGNETIC SOUND RECORD

Filed Jan. 20, 1960

June 11, 1963 YASUSHI HOSHINO ET AL 3,093,709

APPARATUS FOR PRINTING MAGNETIC SOUND RECORD PROVIDED WITH A DEVICE FOR THE INSPECTION OF THE INTENSITY OF PRINTED MAGNETIC SOUND RECORD

Filed Jan. 20, 1960

2 Sheets-Sheet 2

United States Patent Office 3,093,709 Patented June 11, 1963

3,093,709

APPARATUS FOR PRINTING MAGNETIC SOUND RECORD PROVIDED WITH A DEVICE FOR THE INSPECTION OF THE INTENSITY OF PRINTED MAGNETIC SOUND RECORD

Yasushi Hoshino, 462 1-chome, Tamagawa-Okusawa-cho, Setagaya-ku; Mamoru Namikawa, 664 Kugahara-cho, Ota-ku; and Shigezo Tochihara, 531 Matsunoki-Jyuta-ku, Matsunoki-cho, Suginami-ku, all of Tokyo, Japan Filed Jan. 20, 1960, Ser. No. 3,615
Claims priority, application Japan Jan. 27, 1959
3 Claims. (Cl. 179—100.2)

The inventors of the present application have already invented an apparatus for magnetic sound recording and reproducing suitable for simultaneous hearing and seeing the content of a magnetic sound record sheet.

According to said invention, the magnetic sound record sheet used on said apparatus has visible descriptions on its one surface and magnetic sound recording on the other surface, and the visible descriptions can be observed while the magnetic sound recording is being reproduced by said apparatus for better understanding or enjoyment of the content of said magnetic sound record sheet. (See U.S. patent applications Ser. No. 578,911; Ser. No. 578,912; and Ser. No. 579,004, filed April 18, 1956.)

Such an apparatus and a sheet are very useful for various purposes, for example, for learning foreign languages, advertisement, communication, etc. However, the apparatus has a drawback in that the magnetic sound record sheet can be produced only one by a single recording operation. It is often desirable to have many magnetic sound record sheets of same content, for example, for a wide circulation of an advertisement or for the production of a number of books formed by compiling a plurality of magnetic sound record sheets. In order to overcome this drawback, the inventors have already proposed a printing system which allows to produce a number of magnetic sound record sheets which have the same magnetic sound record by printing from a master magnetic sound record sheet (e.g. U.S.A. patent application Ser. No. 691,944, filed October 23, 1957).

According said printing system, a master sheet and a new sheet having no sound record (hereafter referred to as unprinted sheet) are overlapped keeping the magnetic coating films of the two sheets in contact and a magnetic field is applied to them to print the sound record of the master sheet to the unprinted sheet under the influence of the magnetic field which is gradually attenuated to zero. The printing operation is repeated by removing the printed sheet and inserting an unprinted sheet in the place of the former to obtain a great number of printed sheets from a single master sheet. However, there is one thing which is not to be overlooked in the repetition of the printing operation. This is the fact that the intensity of the magnetic record of the master sheet and consequently also that of the magnetic sound record printed on the new fresh magnetic sound record sheet is decreased according to the increase of the number of repetition of the printing operation, and if the operation is repeated too many times, the intensity of the printed magnetic sound record will become so weak that it can no longer reproduce sound which is suitable for practical use. Generally until the repetition of printing operation reaches as many times as 2000 times, the printed sheet has magnetic sound record of a strength sufficient for reproduction, but this number of allowable repetition will be varied depending upon various factors such as the type of the master sheet and the unprinted sheet, the magnetic field applied, the required degree of clearness of the reproduced sound, etc., and if the printing operation is continued excessively, some of the printed sheets will become useless incurring a great loss of the fresh sheets, time, labour and the operation cost. In order to avoid such disadvantage, it is necessary for the operator to check frequently the printed sheets to confirm whether the printed sheets have sufficient intensity of magnetic sound record by placing them on an apparatus for reproduction. During such checking, the printing operation must be stopped. Moreover, it will be unavoidable to produce sheets of too weak intensity to some extent even with frequent checking. This makes the operator nervous and brings about the decrease of efficiency.

The object of the present invention is to eliminate the disadvantages appertaining to printing operation as described above. According to the present invention, a special zone of magnetic sound record of a narrow area is provided for the inspection of the intensity of the printed magnetic sound record in the margin of at least one of the master sheet and the printed sheet and a special reproducing device is provided for the inspection of a magnetic sound record in said special zone. This device is adapted to inspect automatically the special zone of the master sheet or of the last printed sheet after printing of a predetermined number of fresh sheets. The predetermined number may be one or more according to the allowable range of the lowest intensity of the magnetic record printed.

According to the present invention, the intensity of the last printed magnetic sound record is determinable during the time of the printing operation and therefore the printing operation can continue without fear of printing magnetic sound record of too low intensity. Furthermore, the printing operation can be stopped immediately when the intensity of the printed magnetic sound record reaches a predetermined value.

Further features and advantages of the present invention will be understood fully from the following explanations of some embodiments of the present invention made with reference to accompanying drawings which illustrate but not limit the present invention.

In the accompanying drawings.

Now explanation will be made with reference to drawings.

Figure 1:
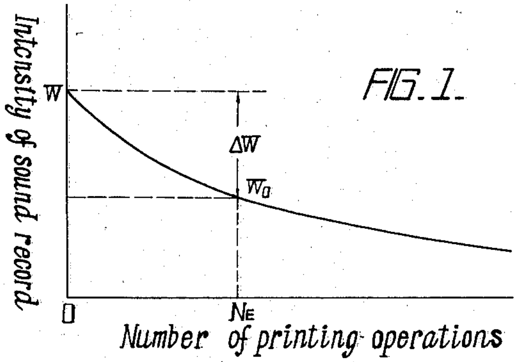
FIG. 1 is a diagram illustrating the relation between the intensity of magnetic sound record on a printed sheet and the number of printings carried out.

In FIG. 1, the abscissa represents the number of printing operations executed using a single master sheet and the ordinate represents the intensity of magnetic record printed on fresh magnetic sheets. In the first printing operation, the printed magnetic record will have an intensity of W but the intensity will decrease as the number of printing operation increases and will become $W_0$ decreased by $\Delta W$ after $N_E$ times of printing operations. If the desired lowest intensity of the printed magnetic sound record is $W_0$, the printing operation must be stopped after $N_E$ times of printing and the master sheet which has been used $N_E$ times must be replaced by a new master sheet.

Figure 2:
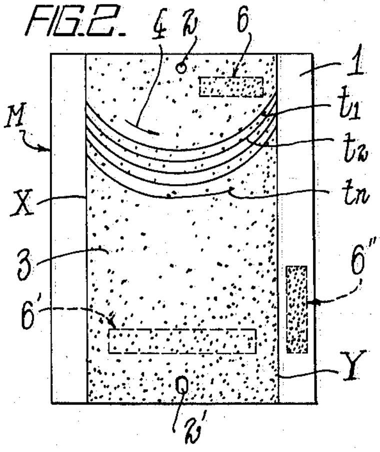
FIG. 2 is a plan view illustrating a master sheet provided with a special zone of magnetic sound record for inspection.
Figure 5:
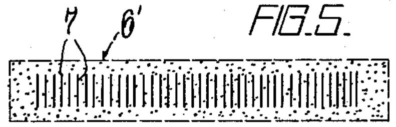
FIG. 5 is a plan view illustrating by an enlarged scale a special zone for inspection on a master sheet.

According to the present invention, a special zone of a narrow area for inspection is provided on some suitable part of a master sheet where the sound record does not exist. In FIG. 2, 6, 6′ and 6″ are some examples of such zones on a master sheet M. In one of these parts, for example in 6′, a special signal as shown in FIG. 5 is recorded by a special device as explained hereinafter. Using this master sheet M, printing is conducted on a fresh magnetic record sheet which has no sound record. For conducting the printing operation, various apparatuses may be contemplated.

Figure 3:
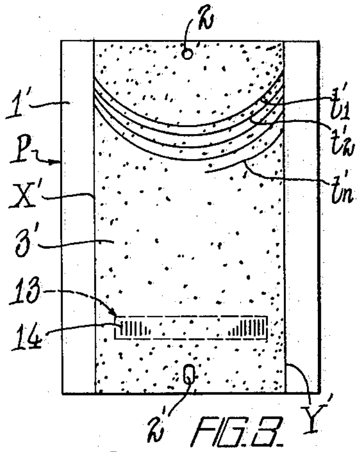
FIG. 3 is a plan view illustrating a printed sheet which has special zone of magnetic sound for inspection.
Figure 4:
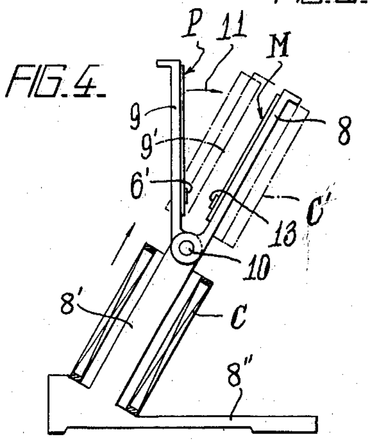
FIG. 4 is a side view illustrating diagrammatically one of the embodiments of an apparatus for printing of magnetic sound record from a master sheet to a fresh sheet.
Figure 6:
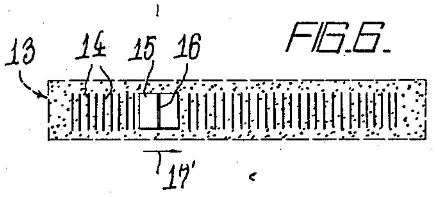
FIG. 6 is a plan view illustrating by an enlarged scale a special zone for inspection on a printed sheet.

FIG. 4 is one example of such printing apparatuses. In FIG. 4, the apparatus has consolidated body parts 8, 8′ and 8″ and a swingable plate 9 which is pivoted at 10 on the body. On the part 8 is placed a master sheet M facing its magnetic layer having sound records to the plate 9. On the plate 9 is placed a fresh magnetic sheet to be printed facing its magnetic layer to the master sheet. Then the plate 9 is swung to the direction of the arrow 11 to take the position of 9′ shown by dotted line thereby bringing the magnetic layer of the unprinted sheet in contact with that of the master sheet. An electric coil C is movable along the body parts 8′ and 8 and is moved to the position of C′ to surround the part 8 and the plate 9. Under this condition, alternating current is supplied to the coil C and then the intensity of the current is gradually decreased until zero and then the coil is returned to the original position to open the plate 9 to its original position. By this operation, all sound tracks including the signal in the special zone 6′ are printed on the magnetic layer of the sheet P as shown in FIG. 3. In FIG. 2, 1 represents a basic paper sheet, 3 a magnetic layer, X and Y side demarcation lines of said magnetic layer, $t_1$ $t_2$ . . . $t_n$ sound tracks and 6′ a special zone for the signal for the inspection while in FIG. 3, 1′ represents a basic paper sheet, 3′ a magnetic layer, X′ and Y′ demarcation lines of said magnetic layer, $t_1'$, $t_2'$ . . . $t_n'$ printed sound tracks and 13 a special zone for the signal for inspection. When the zone 6′ of the master sheet has signal tracks as shown in FIG. 5, the zone 13 of the printed sheet has tracks 14 as shown in FIGS. 3 and 6.

Figure 8:
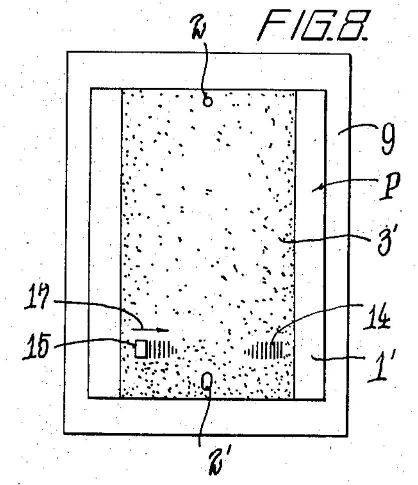
FIG. 8 is a plan view illustrating a printed sheet placed on a swingable plate of the printing apparatus of FIG. 4.

When the plate is opened, the printed sheet P is still on said plate as shown in FIG. 8. Under this condition, the signal 14 is scanned by a special head 15 as explained hereinafter in order to know the intensity of the sound record of said printed sheet. The signal mark is different from the sound track, but since the intensity of the printed signal is in direct proportion to the intensity of the printed record sound, the limit of the repetition of printing operation can be found by the inspection of the printed signal. The zone of the printed signal is placed in a convenient place and it is so arranged that it can be easily and automatically examined by a device provided for this purpose. Accordingly it does not need to place the printed sheet on an apparatus for reproduction in order to examine whether or not the printed sheet has sufficient intensity for practical use.

Figure 7:
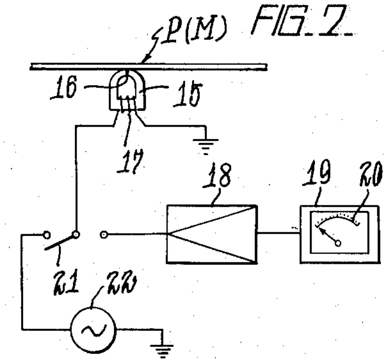
FIG. 7 is a schematic view illustrating a device for the inspection of the special zone of a master sheet or a printed sheet.

With regard to the device for examining the intensity of printed signal, various devices can be easily contemplated by those skilled in the art and the present invention is not limited by the type of such a device. But FIG. 7 illustrates one of the embodiments of such a device.

This device has a sound reproducing head 15 adapted to scan the printed signal mark 14 on the printed sheet. When the plate 9 of the printing apparatus of FIG. 4 is opened, the head 15 is brought to the signal mark 14 to scan the mark with the gap 16 of the head in the straight direction of arrow 17′. At this time, the coil 17 of the head is energized by closing a switch 21 and the picked up sound may be amplified by an amplifier 18 for the examination of the sound. If it is desired, a meter 19 provided with a scale 20 may be connected to the amplifier 18 to indicate the intensity of the signal mark.

When the plate is closed, the head 15 must of course be removed from the space between the plate 9 and the body 8, until the examination of the next printed sheet. Accordingly the motion of the head is interlocked with the motion of the plate 9 of the printing apparatus. To contrive such a device is easy for those skilled in the art inasmuch as the position of the zone 13 for inspection is always in a fixed position when it is scanned by the head 15 and the sound track is straight. Accordingly the construction of such a device is not dwelt upon herein.

It is to be understood that although the signal mark is mentioned as a straight sound track in the above, the signal is not limited to a straight sound track but may be some other means, for example, the intensity of the mark may be detected by the amount of adhesion of iron powders using some suitable device for the purpose.

If the device is so arranged that the printing operation is automatically stopped when the level of the intensity of the printed sound record reaches a predetermined value, it will be more convenient for the operator. Such a device can also be easily contrived, for example, by utilizing the motion of an indicator of a meter 19.

For obtaining a signal sound track 14 for inspection on a printed sheet, it is of course necessary to provide a master signal track 7 in the zone 6′. This master signal track may be recorded on a master sheet with the same device used for the inspection of the printed sheet as illustrated in FIG. 7 by placing the master sheet on the plate 9 in open condition, and energizing the coil 17 of the head 15 with the current from a signal generator 22 by closing the circuit on the left side of FIG. 7 by means of the switch 21.

Figure 10:
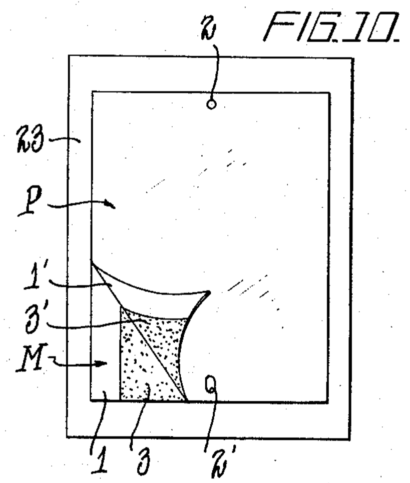
FIG. 10 is a plan view of a master sheet and a fresh sheet placed on a support plate of FIG. 9, a corner of the fresh sheet being turned up in order to show the relationship between the two sheets.
Figures 9, 11, 12, 13:
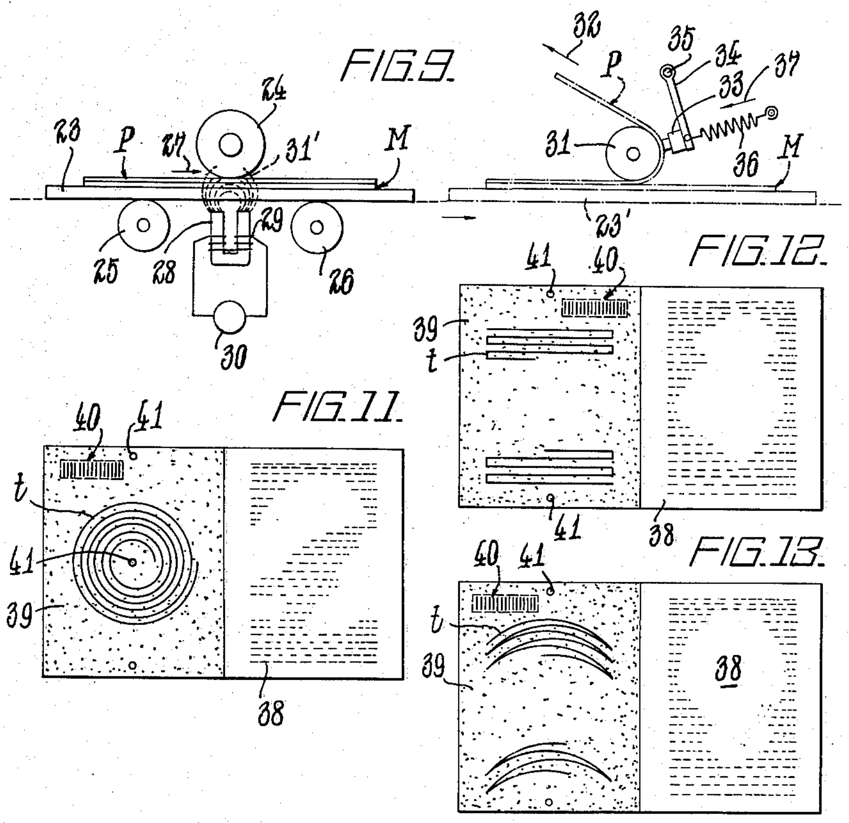
FIG. 9 is a side view illustrating diagrammatically another embodiment of an apparatus for printing magnetic sound record from a master sheet to a fresh sheet.
FIGS. 11, 12 and 13 illustrate some types of magnetic sound record sheets provided with a special zone for inspection according to the present invention.

Now another example of magnetic sound record printing apparatus according to present invention which is often used as sound record printing apparatus will be explained with reference to FIG. 9. In said figure, 23 is a sheet-holding plate, on which are mounted sheets M and P ready for printing, and the plan view thereof is shown in FIG. 10. 24, 25 and 26 are rubber rollers pressing 23, M and P so that 23 may be moved to the direction of arrow 27 with M and P thereon. 28 is iron core and 29 is a coil of an electromagnet, which produces magnetic flux 31′ which constitutes printing magnetic field by the electric current through said coil from the electric source 30. When 23 has been moved to the position 23′ along the direction of arrow 27, the printing process is completed, and only P is pulled apart (this mechanism is not shown) and is removed from the printing machine moving to the direction of arrow 32 through rollers 31. Thus the object of present invention is equally fulfilled as the example hereinbefore described, by watching the strength of the magnetic sound record print of every sheet after finishing printing process by scanning the head 33 pressed thereon over the sound record part for measuring purpose 14 in FIG. 3. The spring 36 acts on the head to urge it to the direction of arrow 37 against the tracks, 34 being a supporting member fixed on the head and 35 being the fulcrum thereof. The above described are examples according to present invention, but all other mechanisms enabling to fulfill the object of present invention will be included in present application.

Although the above explanation was made referring to the sheet of circular arc like tracks as $t_1'$, $t_2'$ . . . $t_n'$ in FIG. 3, the sound record tracks may be of any other form, such as volution, rectangle, or semi-circle connected in zig-zag as in FIGS. 11, 12 or 13, in which 38 is made of paper or plastic with descriptions of letters or such descriptions to be expected on the front or back surface thereof, 39 is the magnetic coating with sound record tracks $t$, and 40 is the signal part for inspection which, it is needless to say, may also be provided on the paper side. 41 is holes to set the sheet in a fixed position on the sound recording and reproducing machine. The observation of the signal part for inspection by a reproducing head may be carried out after each process of printing or after several processes thereof. Further a mechanism may be provided on the printing machine which may scan over the sound record tracks $t_1'$, $t_2'$ . . . $t_n'$ or $t_1'$, $t_2'$ . . . $t_n$ after each process or after several processes of printing instead of special sound record strength measuring parts hereinbefore described.

If it is desired, it is also possible to measure the change of the signal mark on the master sheet M instead of the signal mark of the printed sheet, since the decrease of the intensity of the signal is in direct proportion to the decrease of the intensity of the signal mark on the printed sheet and the decrease of the latter can be indirectly known through the decrease of the former.

What we claim is:

1. Apparatus for printing a plurality of sheets from a master sheet having a recorded signal thereon in a determinable zone, said apparatus comprising: means for recording a reference signal of determinable intensity on said master sheet in a zone external of the first said zone, means for printing said signals on said sheets from the master sheet and means for measuring said reference signal on said plurality of sheets to determine the intensity thereof.

2. Apparatus as claimed in claim 1 comprising means operatively associated with the means for printing said signals, for stopping said printing with said reference signal having an intensity less than a predetermined minimum.

3. Apparatus as claimed in claim 1 wherein the first said means records a magnetic reference signal and the means for measuring the reference signal comprises a magnetic head.

References Cited in the file of this patent

UNITED STATES PATENTS

| | | |
|---|---|---|
| 2,550,803 | Goddard | May 1, 1951 |
| 2,867,692 | Camras | Jan. 6, 1959 |
| 2,886,330 | Halftermeyer | May 12, 1659 |
| 2,918,537 | Camras | Dec. 22, 1959 |
| 2,926,219 | Hollmann | Feb. 23, 1960 |